United States Patent
Marking et al.

(10) Patent No.: US 7,435,358 B2
(45) Date of Patent: Oct. 14, 2008

(54) UVC-EMITTING SR(AL,MG)$_{12}$O$_{19}$:PR PHOSPHOR AND LAMP CONTAINING SAME

(75) Inventors: Gregory A. Marking, Sayre, PA (US); Thomas M. Snyder, Laceyville, PA (US)

(73) Assignee: Osram Sylvania Inc., Danvers, MA (US)

( * ) Notice: Subject to any disclaimer, the term of this patent is extended or adjusted under 35 U.S.C. 154(b) by 483 days.

(21) Appl. No.: 11/160,052

(22) Filed: Jun. 7, 2005

(65) Prior Publication Data

US 2006/0273710 A1    Dec. 7, 2006

(51) Int. Cl.
*C09K 11/64* (2006.01)
*C09K 11/55* (2006.01)
*H01J 1/62* (2006.01)
*H01J 11/02* (2006.01)
*H01J 61/16* (2006.01)

(52) U.S. Cl. ............... 252/301.4 R; 313/486; 313/607; 313/635; 313/643; 313/495; 313/494

(58) Field of Classification Search .......... 252/301.4 R; 313/486, 607, 635, 643, 495, 494
See application file for complete search history.

(56) References Cited

U.S. PATENT DOCUMENTS

| | | | |
|---|---|---|---|
| 5,140,604 A | 8/1992 | Alablanche | |
| 5,557,112 A | 9/1996 | Csoknyai et al. | 250/504 R |
| 5,571,451 A | 11/1996 | Srivastava et al. | 252/301.4 R |
| 6,246,171 B1 | 6/2001 | Vollkommer et al. | 313/586 |
| 6,398,970 B1 | 6/2002 | Jüstel et al. | 210/748 |
| 6,469,435 B1 | 10/2002 | Seibold et al. | 313/493 |
| 6,566,810 B1 | 5/2003 | Seibold et al. | 313/582 |
| 6,613,248 B2 | 9/2003 | Setlur et al. | 252/301.4 R |
| 2003/0011310 A1 | 1/2003 | Juestel et al. | 313/640 |
| 2004/0021407 A1 | 2/2004 | Baillie et al. | 313/111 |
| 2007/0221883 A1 | 9/2007 | Marking et al. | |

FOREIGN PATENT DOCUMENTS

| | | |
|---|---|---|
| EP | 1 571 692 A2 | 9/2005 |
| HU | 221574 B1 | 11/2002 |
| WO | WO 2004/066334 A2 | 8/2004 |

OTHER PUBLICATIONS

A. Srivastava et al., Luminescence of $Pr^{3+}$ in $SrAl_{12}O_{19}$: Observation of two photon luminescence in oxide lattice, *J. Luminescence*, 71 (1997) 285-290.

*Primary Examiner*—C. Melissa Koslow
(74) *Attorney, Agent, or Firm*—Robert F. Clark

(57) ABSTRACT

The UVC emission of a $Sr(Al,Mg)_{12}O_{19}$:Pr is improved by providing an excess of magnesium relative to the molar amount praseodymium In particular, the UVC-emitting phosphor has a composition represented by the formula $Sr_{1-x}Pr_xAl_{12-y}Mg_yO_{19}$ wherein y>x. The phosphor is excited by vacuum ultraviolet radiation and may be used to create a mercury-free germicidal lamp.

21 Claims, 3 Drawing Sheets

UVC-EMITTING SR(AL,MG)$_{12}$O$_{19}$:PR PHOSPHOR AND LAMP CONTAINING SAME

TECHNICAL FIELD

This invention relates to UVC-emitting phosphors. More particularly, this invention relates to increasing the UVC emission of Sr(Al,Mg)$_{12}$O$_{19}$:Pr phosphors.

BACKGROUND OF THE INVENTION

The quantum-splitting phosphor Sr$_{1-x}$Pr$_x$Al$_{12-x}$Mg$_x$O$_{19}$ where 0<x≦0.2 has been described in U.S. Pat. No. 5,571,451. The quantum-splitting of the Pr$^{3+}$ ion is of interest because of the potential to produce a phosphor with a quantum efficiency exceeding unity, i.e., producing two visible photons for each UV photon. In the phosphor described above, the insertion of the Pr$^{3+}$ activator into the lattice for Sr$^{2+}$ is charge compensated by replacing an equal amount of Al$^{3+}$ with Mg$^{2+}$. Because of its quantum-splitting behavior, investigations of this phosphor have been focused on its visible emission at about 400 nm in response to stimulation by vacuum ultraviolet (VUV) radiation at 185 nm.

U.S. Pat. No. 6,613,248 describes alternative compositions designed to increase the amount of visible light emitted from this system. It is therein described that the above-described phosphor also produces a considerable ultraviolet emission in the region from 250 to 350 nm and that this part of the emission reduces the overall visible light output that otherwise might be higher.

SUMMARY OF THE INVENTION

Unlike the prior art investigations, this invention is focused on improving the ultraviolet emission from the Sr(Al,Mg)$_{12}$O$_{19}$:Pr system for use in germicidal lamps. More particularly, this invention is concerned with increasing the UVC emission of the phosphor.

The ultraviolet spectrum generally is divided into three regions: UVA (400 nm-320 nm), UVB (320 nm-290 nm) and UVC (290 nm-200 nm). Of these, the UVC region is of primary interest for germicidal applications. The need for germicidal lamps has increased in recent years due to concerns about safety and the necessity of obtaining potable drinking water during such natural catastrophes as floods. In addition, UVC-emitting lamps find use in other applications such as purification of surfaces and air, the medical sterilization of open wounds, medical phototherapy, and photo-curing of UV-sensitive polymers and resins.

In addition, the increased interest in Hg-free technologies has emphasized the development of non-mercury-based germicidal lamps. One such type of water disinfecting device is a Xe-plasma-based, VUV-excited lamp which is coated with phosphors emitting in the germicidal range 220-280 nm. Such a lamp is described in U.S. Pat. No. 6,398,970. Thus, it is advantageous to have a UVC-emitting phosphor which is excited by VUV radiation.

The inventors have discovered that the UVC emission of a Sr(Al,Mg)$_{12}$O$_{19}$:Pr phosphor may be significantly enhanced by formulating the phosphor with a greater molar amount of magnesium relative to the molar amount of praseodymium. Whereas the prior art compositions described above required a 1:1 correlation between the molar amounts of Pr and Mg, the phosphor of this invention requires a molar ratio of Mg to Pr that is greater than unity. More particularly, the phosphor of this invention has a composition that may be represented by the formula Sr$_{1-x}$Pr$_x$Al$_{12-y}$Mg$_y$O$_{19}$ wherein y>x.

Preferably, the composition has an x value of 0.01≦x≦0.1 and a y value of 0.02≦y≦0.15. More preferably, the y/x ratio has a value of 1<y/x≦3, and even more preferably 1<y/x≦2.

In a further aspect, the phosphor has a composition represented by the formula Sr$_{1-x}$Pr$_x$Al$_{12-y}$Mg$_y$O$_{19}$ wherein 0.03≦x≦0.07, 0.06≦y≦0.1 and 1.1≦y/x≦2.7, and more preferably 0.04≦x≦0.07, 0.06≦y≦0.08 and 1.1≦y/x≦2.0.

In a still further aspect, there is provided a method of making a UVC-emitting phosphor which comprises (a) forming a mixture of stoichiometric amounts of a source of strontium, a source of aluminum, a source of magnesium and a source of praseodymium according to the formula Sr$_{1-x}$Pr$_x$Al$_{12-y}$Mg$_y$O$_{19}$ wherein 0.01≦x≦0.1, 0.02≦y≦0.15 and y>x; and (b) firing the mixture in a reducing atmosphere to form the UVC-emitting phosphor.

The phosphor of this invention is excitable by vacuum ultraviolet radiation and may be combined with a source of vacuum ultraviolet radiation to produce a UVC-emitting lamp that is capable of germicidal application. More preferably, the source of vacuum ultraviolet radiation is a Xe excimer discharge formed in a dielectric barrier discharge lamp. In this case, the UVC-emitting phosphor of this invention is coated on an interior wall of the discharge vessel in order to produce a mercury-free UVC-emitting lamp.

DETAILED DESCRIPTION OF THE INVENTION

For a better understanding of the present invention, together with other and further objects, advantages and capabilities thereof, reference is made to the following disclosure and appended claims taken in conjunction with the above-described drawings.

Figure 1:
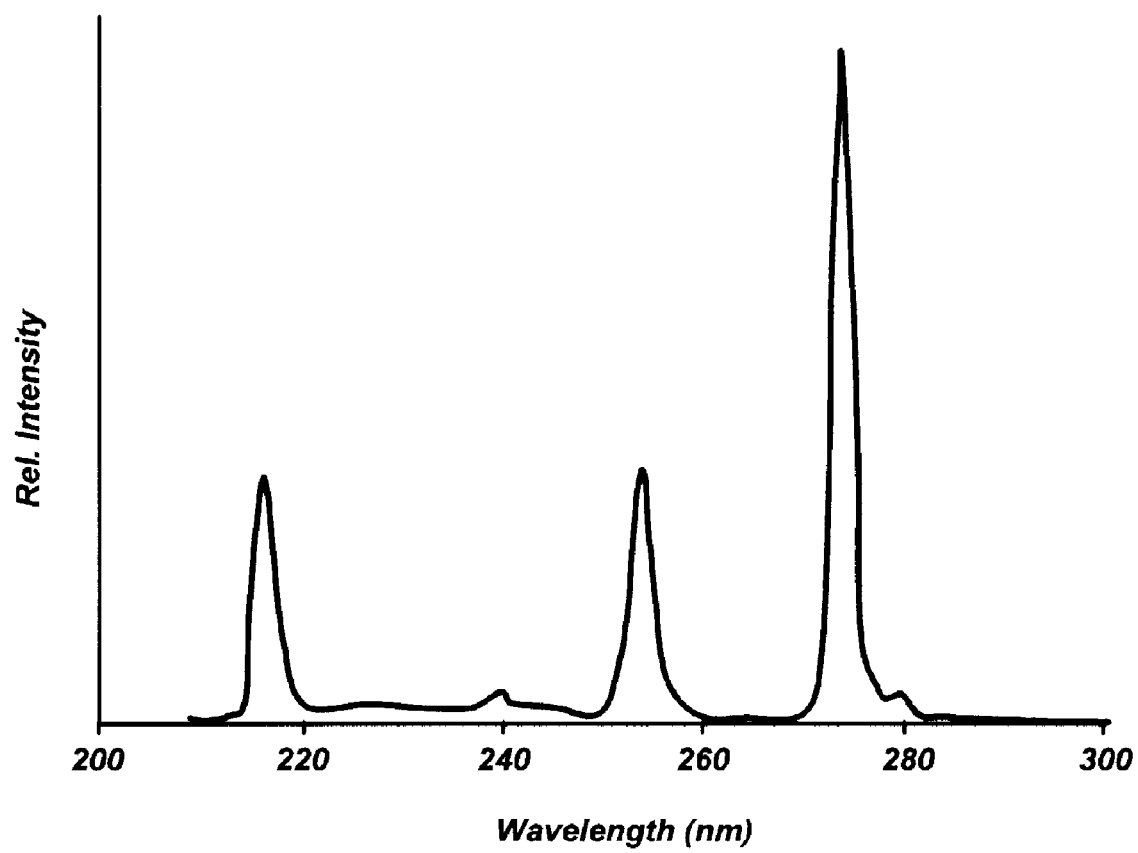
FIG. 1 is an emission spectrum of a Sr$_{0.95}$Pr$_{0.06}$Al$_{11.92}$Mg$_{0.08}$O$_{19}$ phosphor under 185 nm excitation.

FIG. 1 shows the emission spectra between 200 nm and 300 nm of a Sr$_{0.95}$Pr$_{0.06}$Al$_{11.92}$Mg$_{0.08}$O$_{19}$ phosphor according to this invention. The phosphor was formulated with a slight stoichiometric excess (0.01 moles/mole phosphor) of Sr. The spectrum was measured under 185 nm excitation radiation using an Acton SpectraPro-2500i monochromator/spectrograph with a deuterium light source and a VM-504 vacuum monochromator. Three emission peaks are observed. The major emission peak in the UVC region of the Sr$_{0.95}$Pr$_{0.06}$Al$_{11.92}$Mg$_{0.080}$O$_{19}$ phosphor occurs at 274 nm.

Figure 2:
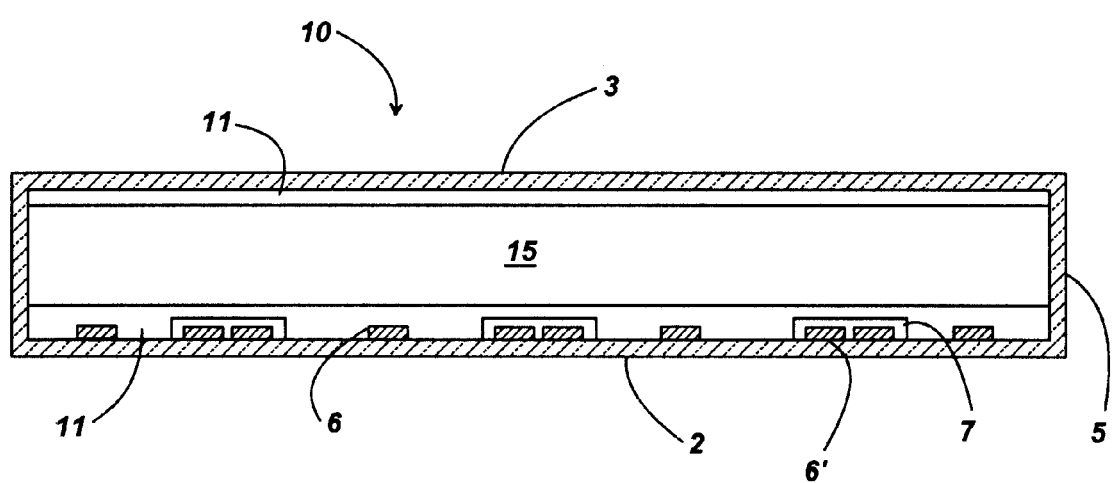
FIG. 2 is a cross sectional illustration of a Hg-free germicidal lamp containing the phosphor of this invention.

FIG. 2 illustrates a type of VUV-excited device which is generally referred to as a dielectric barrier discharge lamp. The flat rectangular-shaped device is shown in cross section. The discharge vessel 10 is constructed of a transparent material such as glass and comprises a front plate 3 and a back plate 2 which are joined by frame 5 at the periphery of the plates. The discharge vessel 10 encloses discharge chamber 15 which contains a rare gas, typically xenon, or mixture of rare gases, and is used to generate a discharge which emits vacuum ultraviolet (VUV) radiation. The back plate 2 has multiple strip electrodes 6 which may serve as anodes and cathodes during operation. At least some of the electrodes 6' are covered with a dielectric barrier layer 7. Further examples of dielectric barrier discharge lamps are described in U.S. Pat. Nos. 6,566,810, 6,246,171 and 6,469,435.

A germicidal lamp may be formed by coating the inner surface of the top plate 3 and back plate 2 with a phosphor layer 11 that contains the UVC-emitting phosphor of this invention. The UVC-emitting phosphor converts at least some of the VUV radiation from the plasma into UVC radiation which may be used for germicidal purposes.

EXAMPLES

The $Sr_{1-x}Pr_xAl_{12-y}Mg_yO_{19}$ phosphor may be prepared by thoroughly dry blending the appropriate metal oxides, hydroxides, carbonates, and halides, then firing the blended material in a reducing atmosphere of 75% $H_2$-25% $N_2$ for at least 1.5 hours at temperatures between about 1500° C. to about 1600° C. Preferred starting materials include $Al(OH)_3$, MgO, $SrF_2$, $SrCO_3$, and $Pr_4O_7$. A slight stoichiometric excess (0.01 moles/mole phosphor) of strontium is preferred in the formulation. Once fired, the phosphor may be sifted and analyzed at that point or further processed with water and/or chemical washing and milling steps before it is dried, sifted, and analyzed. Chemical precipitation techniques may also be used to prepare a thorough mixture ready for firing in a reducing atmosphere.

Table 1 gives the UVC brightness of several phosphor samples formulated with varied Pr and Mg levels. The relative integrated intensity of the 274 nm line emission was measured for the region from 265 nm to 290 nm. The brightness in Table 1 is given relative to the phosphor sample wherein x=y=0.01. The spectrometer used to make the measurements was a Perkin-Elmer LS-50B model that had been modified to include a nitrogen-purged sample chamber fitted with a Xe lamp (XeCM-L from Resonance, Ltd., Barrie, Ontario, Canada) for vacuum ultraviolet excitation. Powder plaques were illuminated while excluding air from the VUV beam path. The Xe lamp had a very intense sharp Xe emission line at 147 nm and a broad, much less intense, Xe excimer band emission around 173 nm.

TABLE 1

$Sr_{1-x}Pr_xAl_{12-y}Mg_yO_{19}$ Phosphor Samples (Rel. brightness = 100% for x = y = 0.01)

| moles Pr (x) | moles Mg (y) | Rel. Brightness | Mg/Pr ratio (y/x) |
| --- | --- | --- | --- |
| 0.01 | 0.01 | 100.0% | 1.00 |
| 0.01 | 0.08 | 80.3% | 8.00 |
| 0.03 | 0.08 | 129.3% | 2.67 |
| 0.04 | 0.04 | 77.8% | 1.00 |
| 0.04 | 0.06 | 174.8% | 1.50 |
| 0.04 | 0.08 | 135.3% | 2.00 |
| 0.04 | 0.10 | 124.7% | 2.50 |
| 0.05 | 0.05 | 86.3% | 1.00 |
| 0.05 | 0.07 | 144.8% | 1.40 |
| 0.05 | 0.08 | 138.5% | 1.60 |
| 0.05 | 0.10 | 116.7% | 2.00 |
| 0.06 | 0.06 | 116.3% | 1.00 |
| 0.06 | 0.07 | 146.8% | 1.17 |
| 0.06 | 0.08 | 143.1% | 1.33 |
| 0.06 | 0.09 | 129.5% | 1.50 |
| 0.06 | 0.10 | 126.6% | 1.67 |
| 0.07 | 0.06 | 95.4% | 0.86 |
| 0.07 | 0.07 | 110.9% | 1.00 |
| 0.07 | 0.08 | 139.3% | 1.14 |
| 0.07 | 0.09 | 130.2% | 1.29 |
| 0.07 | 0.10 | 128.3% | 1.43 |
| 0.10 | 0.08 | 96.6% | 0.80 |
| 0.10 | 0.10 | 104.3% | 1.00 |

The brightness data in Table 1 indicate that the UVC emission in the region from 265 to 290 nm is increased when the number of moles of Mg is greater than the number of moles of Pr, i.e., y>x. This result is not known from the prior art which required an equal number of moles, i.e., x=y.

Four additional samples were made having a composition similar to the brightest composition in Table 1 (x=0.04 and y=0.06). The brightness average for all five samples including the sample in Table 1 was 157% relative to the x=y=0.01 composition.

The effect of the higher magnesium level may be more clearly observed if the data presented in Table 1 is re-normalized to set the relative brightness at 100% for x=y within each sample group containing the same Pr level. The re-normalized data is presented in Table 2 for the samples having x=0.04, 0.05, 0.06, and 0.07.

TABLE 2

$Sr_{1-x}Pr_xAl_{12-y}Mg_yO_{19}$ Phosphor Samples (Rel. Brightness = 100% for x = y)

| moles Pr (x) | moles Mg (y) | Rel. Brightness | Mg/Pr ratio (y/x) |
| --- | --- | --- | --- |
| 0.04 | 0.04 | 100.0% | 1.00 |
| 0.04 | 0.06 | 224.6% | 1.50 |
| 0.04 | 0.08 | 173.9% | 2.00 |
| 0.04 | 0.10 | 160.3% | 2.50 |
| 0.05 | 0.05 | 100.0% | 1.00 |
| 0.05 | 0.07 | 167.8% | 1.40 |
| 0.05 | 0.08 | 160.5% | 1.60 |
| 0.05 | 0.10 | 135.3% | 2.00 |
| 0.06 | 0.06 | 100.0% | 1.00 |
| 0.06 | 0.07 | 126.2% | 1.17 |
| 0.06 | 0.08 | 123.0% | 1.33 |
| 0.06 | 0.09 | 111.3% | 1.50 |
| 0.06 | 0.10 | 108.9% | 1.67 |
| 0.07 | 0.06 | 86.1% | 0.86 |
| 0.07 | 0.07 | 100.0% | 1.00 |
| 0.07 | 0.08 | 125.6% | 1.14 |
| 0.07 | 0.09 | 117.4% | 1.29 |
| 0.07 | 0.10 | 115.7% | 1.43 |

Figure 3:
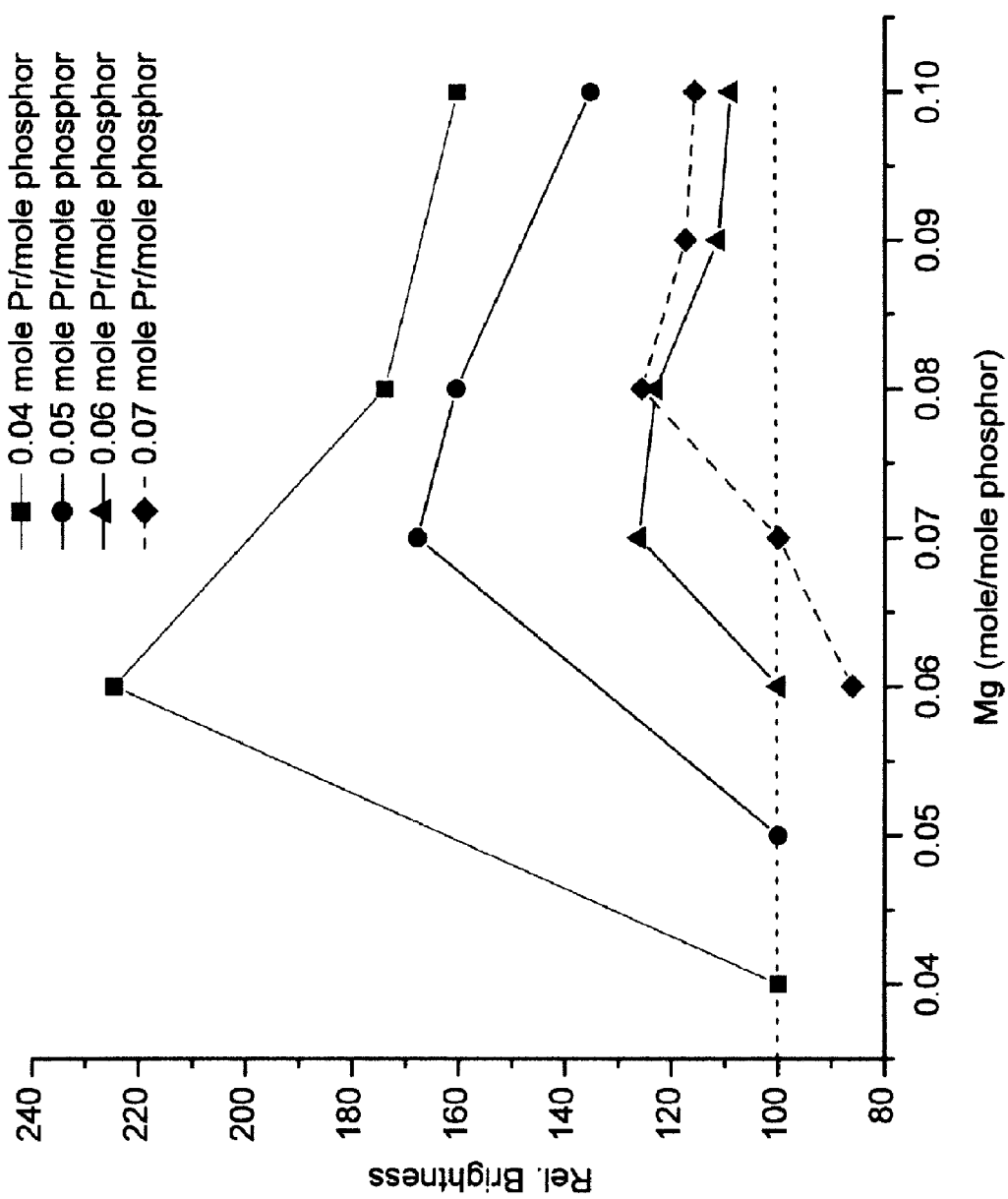
FIG. 3 is a graph showing the effect of varying Mg levels on the relative UVC brightness for a series of Pr levels.

FIG. 3 is a graph of the data from Table 2. It clearly shows that for samples wherein y>x the relative brightness increases quickly from and then slowly declines towards the brightness level of sample wherein x=y. Moreover the data in Tables 1 and 2 indicate the relative brightness is worsened when y<x.

Each Pr level has a preferred range of values for the y/x ratio. For x=0.04, a preferred range is $1.5 \leq y/x \leq 2.5$. For x=0.05, the a preferred range is $1.4 \leq y/x \leq 2.0$. For x=0.06, a preferred range is $1.2 \leq y/x \leq 1.7$. For x=0.07, a preferred range is $1.1 \leq y/x \leq 1.4$.

While there have been shown and described what are present considered to be the preferred embodiments of the invention, it will be apparent to those skilled in the art that various changes and modifications can be made herein without departing from the scope of the invention as defined by the appended claims.

What is claimed is:

1. A UVC-emitting phosphor having a composition represented by the formula $Sr_{1-x}Pr_xAl_{12-y}Mg_yO_{19}$ wherein $0.01 \leq x \leq 0.1$, $0.02 \leq y \leq 0.15$ and y>x.

2. The phosphor of claim 1 wherein $1 < y/x \leq 3$.

3. The phosphor of claim 1 wherein $0.03 \leq x \leq 0.07$, $0.06 \leq y \leq 0.1$ and $1.1 \leq y/x \leq 2.7$.

4. The phosphor of claim 1 wherein $0.04 \leq x \leq 0.07$, $0.06 \leq y \leq 0.08$ and $1.1 \leq y/x \leq 2.0$.

5. The phosphor of claim 1 wherein $1 < y/x \leq 2$.

6. The phosphor of claim 1 wherein x=0.04 and $1.5 \leq y/x \leq 2.5$.

7. The phosphor of claim 1 wherein x=0.05 and $1.4 \leq y/x \leq 2.0$.

8. The phosphor of claim 1 wherein x=0.06 and $1.2 \leq y/x \leq 1.7$.

9. The phosphor of claim 1 wherein x=0.07 and $1.1 \leq y/x \leq 1.4$.

10. A UVC-emitting lamp comprising a discharge vessel containing a source of vacuum ultraviolet radiation and a UVC-emitting phosphor on an interior wall of the discharge vessel, the UVC-emitting phosphor having a composition represented by the formula $Sr_{1-x}Pr_xAl_{12-y}Mg_yO_{19}$ wherein $0.01 \leq x \leq 0.1$, $0.02 \leq y \leq 0.15$ and y>x.

11. The UVC-emitting lamp of claim 10 wherein the source of vacuum ultraviolet radiation is a xenon excimer discharge.

12. The UVC-emitting lamp of claim 11 wherein the discharge vessel has dielectrically impeded electrodes.

13. The UVC-emitting lamp of claim 10 wherein $1<y/x \leq 3$.

14. The UVC-emitting lamp of claim 10 wherein $0.03 \leq x \leq 0.07$, $0.06 \leq y \leq 0.1$ and $1.1 \leq y/x \leq 2.7$.

15. The UVC-emitting lamp of claim 10 wherein $0.04 \leq x \leq 0.07$, $0.06 \leq y \leq 0.08$ and $1.1 \leq y/x \leq 2.0$.

16. The phosphor of claim 1 wherein the phosphor is formulated with a stoichiometric excess of Sr in an amount of 0.01 moles Sr/mole of phosphor.

17. The UVC-emitting lamp of claim 10 wherein the phosphor is formulated with a stoichiometric excess of Sr in an amount of 0.01 moles Sr/mole of phosphor.

18. A method of making a UVC-emitting phosphor comprising:
  (a) forming a mixture of stoichiometric amounts of a source of strontium, a source of aluminum, a source of magnesium and a source of praseodymium according to the formula $Sr_{1-x}Pr_xAl_{12-y}Mg_yO_{19}$ wherein $0.01 \leq x \leq 0.1$, $0.02 \leq y \leq 0.15$ and y>x; and
  (b) firing the mixture in a reducing atmosphere to form the UVC-emitting phosphor.

19. The method of claim 18 wherein the mixture is fired at a temperature between about 1500° C. to about 1600° C.

20. The method of claim 18 wherein the mixture further contains a stoichiometric excess of strontium in an amount of 0.01 moles Sr/mole of phosphor.

21. The method of claim 20 wherein the mixture is fired at a temperature between about 1500° C. to about 1600° C.

* * * * *